Figure 1:
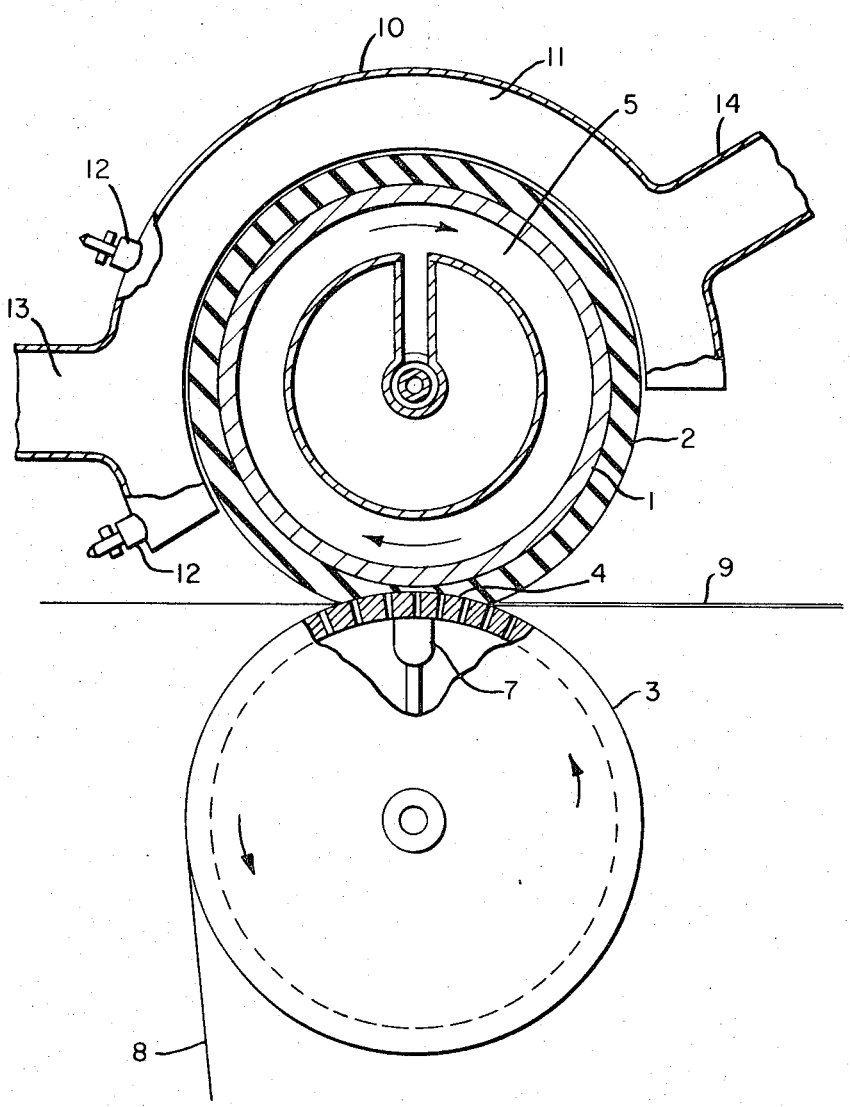
Figure 2:
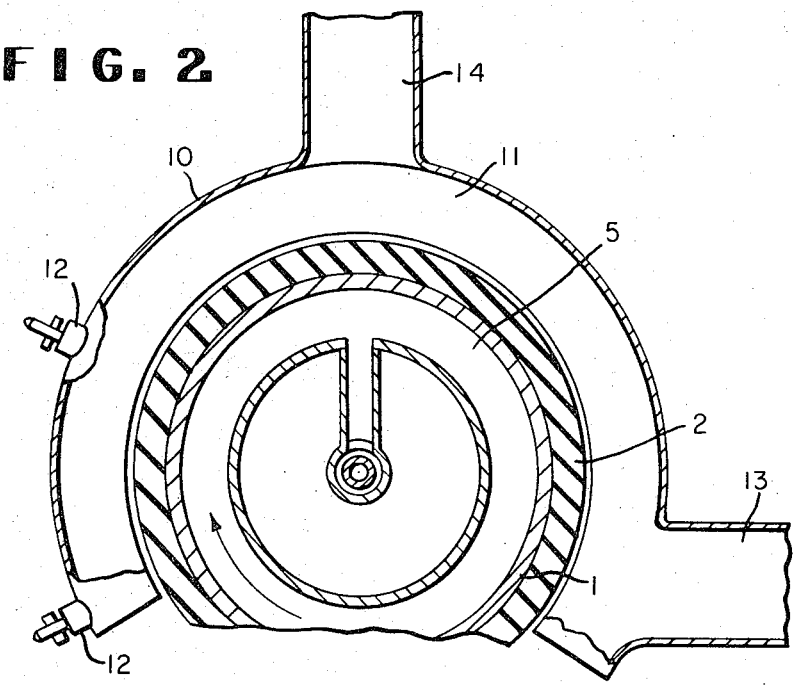

DEFENSIVE PUBLICATION

UNITED STATES PATENT OFFICE

Published at the request of the applicant or owner in accordance with the Notice of Dec. 16. 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1324

T883,026

PROCESS AND APPARATUS FOR COOLING A REVOLVING ROLL

Jerry W. Furrow, Wilmington, Del., assignor to E. I. du Pont de Nemours and Company, Wilmington, Del., a corporation of Delaware

Filed May 15, 1970, Ser. No. 37,705

**Int. Cl. F26b *3/00***

U.S. Cl. 34—9

2 Sheets Drawing. 7 Pages Specification

A hot revolving roll may be cooled in a hood which partially encloses the same, by continuously directing a mist of water on the surface of the roll under the hood whereby water vapor is produced and the roll is cooled, continuously admitting a stream of air into the enclosure to entrain water vapor and continuously removing air containing entrained water vapor from the enclosure.

PROCESS AND APPARATUS FOR COOLING A REVOLVING ROLL

Filed May 15, 1970 2 Sheets-Sheet 1

PROCESS AND APPARATUS FOR COOLING A REVOLVING ROLL

Filed May 15, 1970 2 Sheets-Sheet 2